Sept. 22, 1953 O. BJERING 2,652,964
METHOD AND APPARATUS FOR SEALING CONTAINERS
Filed Nov. 30, 1950 4 Sheets-Sheet 4

Inventor
OLAV BJERING

By Rule & Hoge
Attorneys

Patented Sept. 22, 1953

2,652,964

UNITED STATES PATENT OFFICE 2,652,964

METHOD AND APPARATUS FOR SEALING CONTAINERS

Olav Bjering, Toledo, Ohio, assignor to Owens-Illinois Glass Company, a corporation of Ohio Application November 30, 1950, Serial No. 198,462

19 Claims. (Cl. 226—82)

This invention relates to the packaging of commodities in containers and particularly to a method and apparatus for utilizing waste steam which is used in displacing air in sealing containers.

A common principle employed in the sealing of commodities in containers is to displace the air in the container with an inert gas or to displace the air with a vapor, such as steam, which, after sealing and cooling the container, condenses and creates a partial vacuum. Several inherent difficulties are encountered in the utilization of this method. First, the various parts of the apparatus tend to vary in temperature and thereby result in a non-uniform vacuum being obtained in the containers. Second, in using a vapor such as steam, a great deal of steam is necessarily wasted since an excess is used to insure proper displacement of the air in the container. This excess of steam also creates a working hazard in the vicinity of the sealing machine which lessens the desirability of working in the vicinity thereof.

It is therefore an object of this invention to provide a method and apparatus for utilizing the waste steam from a container sealing apparatus.

Another object of the invention is to provide a method and apparatus for utilizing the waste steam to heat various parts of the vacuum sealing machine.

Another object of this invention is to provide a method and apparatus for utilizing waste steam to cut down the warm-up time on the vacuum sealing apparatus.

Other objects of the invention will appear hereinafter.

Basically, my invention comprises means for confining and inducing a positive movement of waste steam over particular parts of the vacuum sealing apparatus.

This application discloses subject matter disclosed and claimed in the co-pending application of John Hohl and Olav Bjering, Serial Number 193,653, titled "Method and Apparatus for Sealing Containers," filed November 2, 1950, now Patent #2,620,112 dated December 2, 1952.

Referring to the accompanying drawings.

Figure 1:
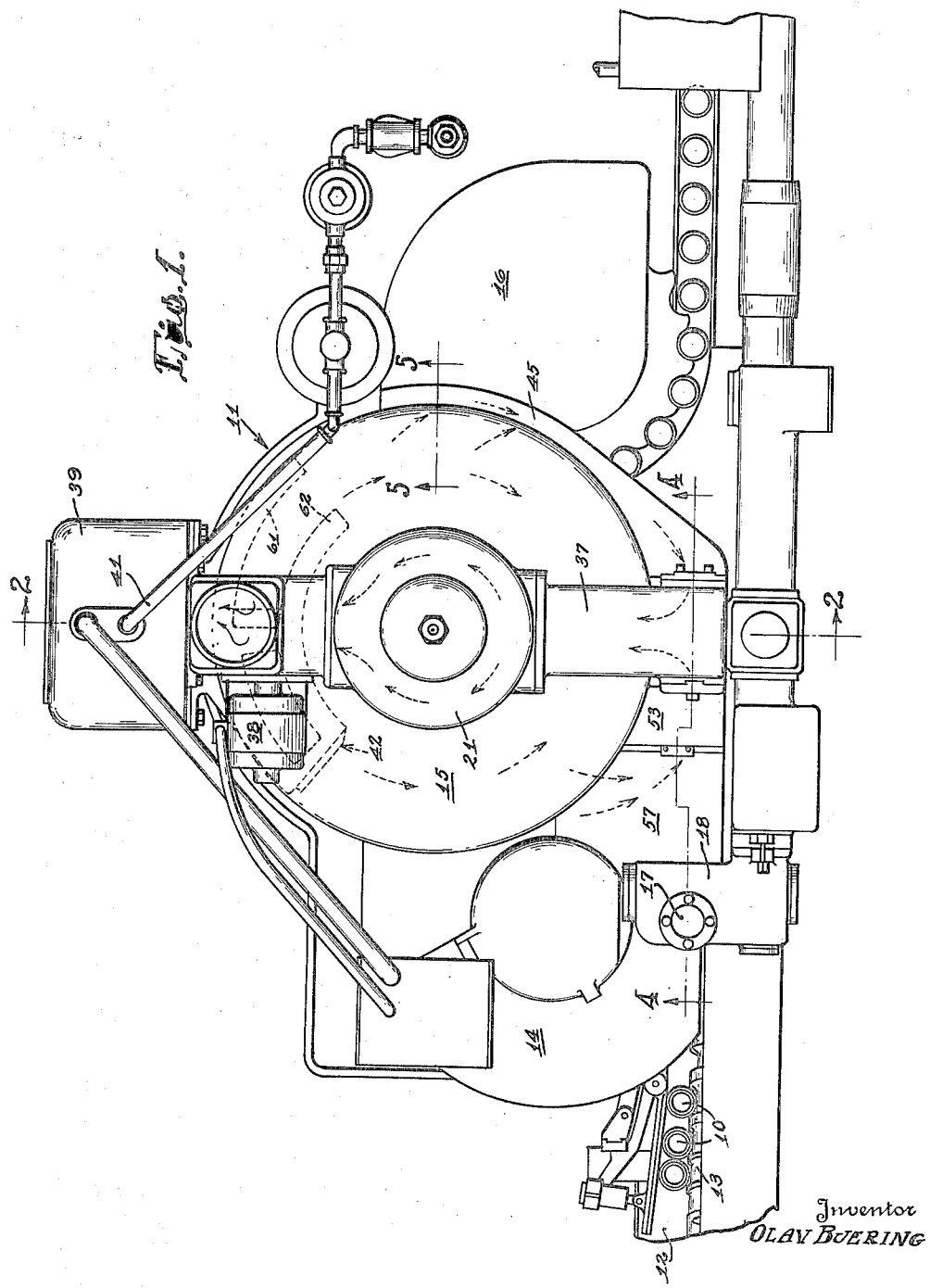
Fig. 1 is a diagrammatic plan view of a rotary sealing machine in which the present invention may be embodied and produced.

Referring to Fig. 1, previously filled containers 10 are fed into a sealing machine 11 by suitable means, herein shown as a conveyor 12 and a spiral spacer and timer 13. The sealing machine comprises three sections 14, 15 and 16. As the containers pass through the first section 14, caps or closures 17 are brought into register with the containers by suitable means shown schematically as 18, and travel about and in register with the containers.

The caps and containers are then transferred to the center section 15. In this section the caps and the containers are subjected to vapor and the caps are then sealed to the containers. The containers are then removed by the third section 16.

Figure 2:
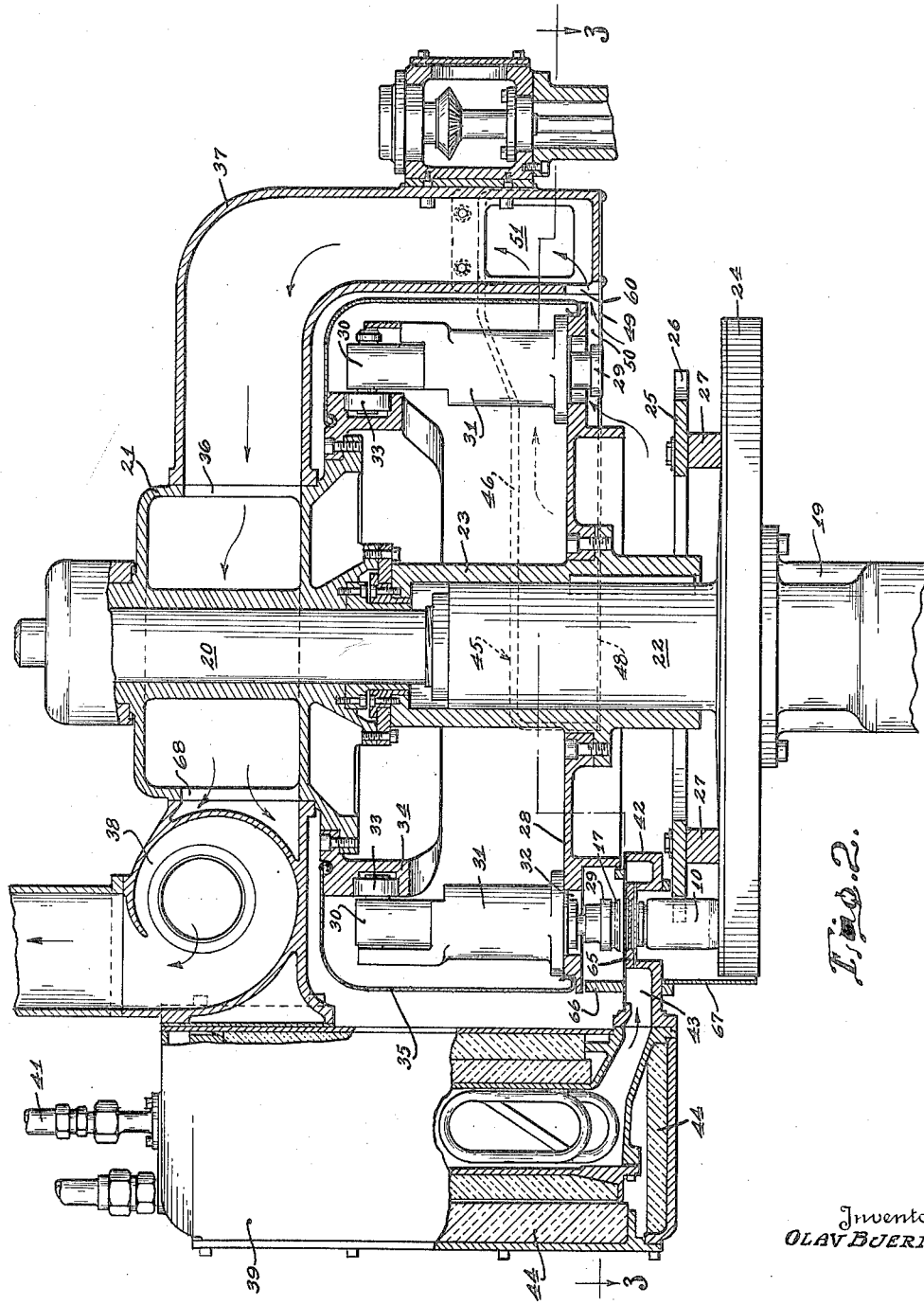
Fig. 2 is a part sectional elevation at the line 2—2 on Fig. 1.

As shown in Fig. 2, the center section 15 comprises a carriage 19, arranged for rotation about a stationary vertical shaft 20. A non-rotating frame member or turret 21 is positioned over the carriage and arranged for up and down adjustment on the shaft 20.

The carriage 19 comprises an inner sleeve 22 and an outer sleeve 23 splined on the sleeve 22 for adjustment up and down on said sleeve 22. The carriage also includes a table or platform 24 connected to the sleeve 22. The containers 10 are supported on this platform 24 as they are carried through the center section 15 and subjected to steam and subsequently sealed. The containers are spaced on the platform by means of a spacing ring 25 formed with pockets or recesses 26 in which the containers are held, the ring 25 being bolted to the platform 24 and spaced thereabove by spacing blocks 27.

A chuck supporting table 28 is bolted to the outer sleeve 23 and supports an annular series of magnetic chucks 29. Each of the chucks 29 carries a series of magnets (not shown) by which it is magnetized for holding the caps. The chuck is keyed to a spindle 30 movable up and down in a casing 31, mounted over an opening 32 on the platform 28. The spindle 30 carries a roller 33 running in a cam track formed in a cam 34 which is bolted to the non-rotating housing or turret 21. The carriage is rotated by a power mechanism not shown.

A hood 35 (Fig. 2) extends outwardly from the cam 34 and downwardly to the level of the chuck supporting table 28 and thereby surrounds the series of chucks. The turret 21 is provided with an opening 36 connected to a passageway 37 which extends over and down one side of the center section substantially to the level of the chuck supporting table. This passageway operates as an outlet for the waste steam as described below.

The turret 21 is provided with a second opening 36 diametrically opposite the opening 36 and connected to an induction fan 38, which induces a circulation through the passageway into the turret and thence through the fan.

A super heater 39 is bolted to the housing of the fan 38 and comprises electrical heating elements 40 which heat the incoming steam which enters through a pipe 41. Means for distributing the steam comprising a steam distributor 42 is connected to the super heater 39 by means of the throat 43. Suitable insulating materials 44 are provided around the super heater 39 and distributor 42.

The steam distributor 42 may be of any suitable construction herein shown as being arc-shaped (Fig. 3) and mounted in such a manner that the caps and containers pass above and below the distributor respectively. Such a distributor is fully described in the aforementioned application of Hohl and Bjering and includes an outer channel 61 and an inner channel 62 on either side of the path of caps and containers. The channels are connected at their midpoint and at the point of inlet of the caps and containers. Tubes 63 extend transversely between the channels in the inlet portion. The tubes include openings 64 through which steam is discharged to provide a quiescent cloud which envelops the caps and filled containers. A mouthpiece 65 is inserted at the center of the channels for directing steam diagonally in the direction of travel of the caps and containers. The caps are sealed to the containers in this zone by the downward movement of the chucks.

A wall 66 is provided above the distributor 42 and a wall 67 is provided below the distributor to prevent leakage of the steam out of the back portion of the machine.

Figure 3:
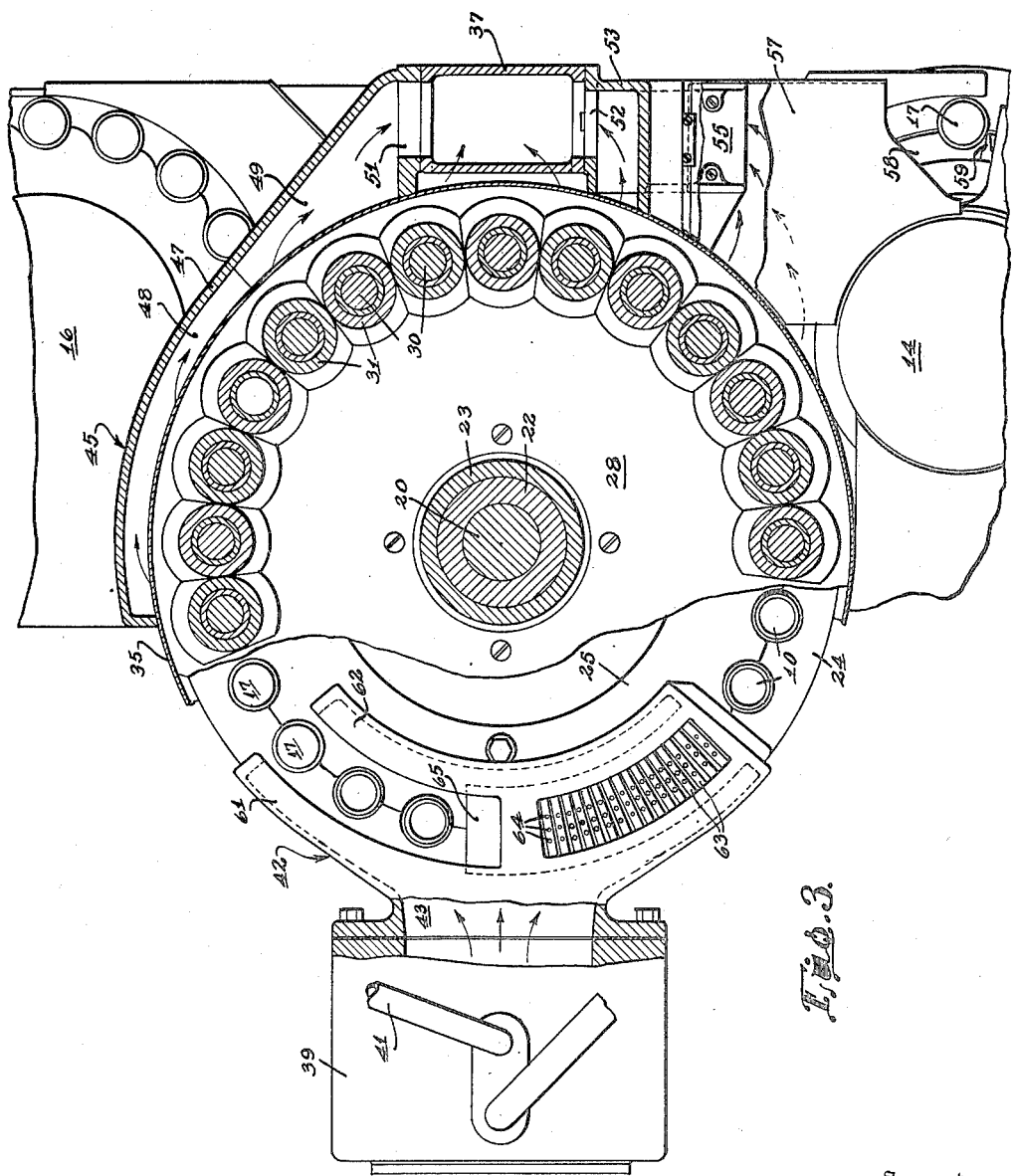
Fig. 3 is a part sectional plan view substantially at the line 3—3 on Fig. 2.
Figure 4:
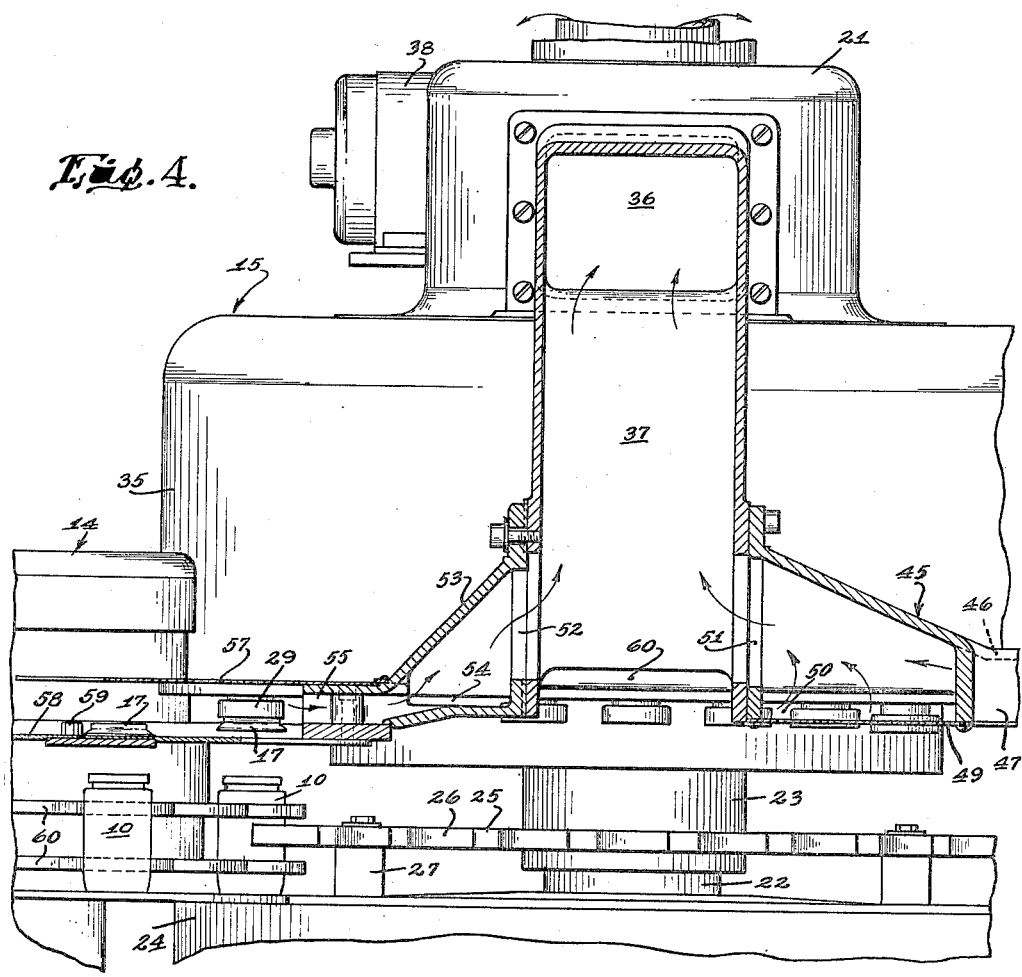
Fig. 4 is a sectional view at the line 4—4 on Fig. 1.

As shown in Fig. 3, a conduit 45 extends along the periphery of the hood 35 from a point beyond the steam distributor 42 to the passageway 37. The conduit is formed with an upper portion 46 (Figs. 2, 3) extending horizontally along a line substantially above the level of the chuck supporting table 28, and a vertical wall 47 extending downwardly from the horizontal portion 46 and spaced from the hood 35. The portion of the conduit 45 which extends and is connected to the passageway 37 is flared as shown in Figs. 3 and 4. The bottom of the conduit is formed by plates 48 and 49 extending horizontally to the periphery of the chuck supporting table 28 so that they are in the same plane as the bottom of the chucks 29 when the chucks are in their uppermost position (Figs. 2 and 4). This construction results in an opening 50 being provided along the lower edge of the hood 35 (Fig. 5) and extending throughout the length of the conduit 45. Steam flows through this opening 50 into the conduit and thence into the passageway 37 through an opening 51.

Another opening 52 (Fig. 4) is provided on the opposite side of the passageway 37 and is connected to a throat 53 which tapers downwardly towards the edge of the hood and provides an opening 54 towards the center of the carriage and an opening 55 towards the outer periphery of the machine. As further shown in Fig. 4 a plate 57 is connected to the throat 53 and extends substantially over the entire area wherein caps 17 and containers 10 are transferred from the first section 14 to the second section 15.

Referring to Fig. 4 in which this area is shown, the caps and containers are carried along in register by means which include a moving plate 58 and lug 59 pushing a cap 17 along in register with a container 10 which is carried along by the star wheel 60. As the cap approaches the center section, the magnetic chuck 29 is moved downward and picks up the cap. At the same time the spacing ring 25 picks up the container.

The cap and container are then carried along in register into the steam distributor zone (Fig. 3) and are subsequently sealed and are then removed by the third section 16.

Figure 5:
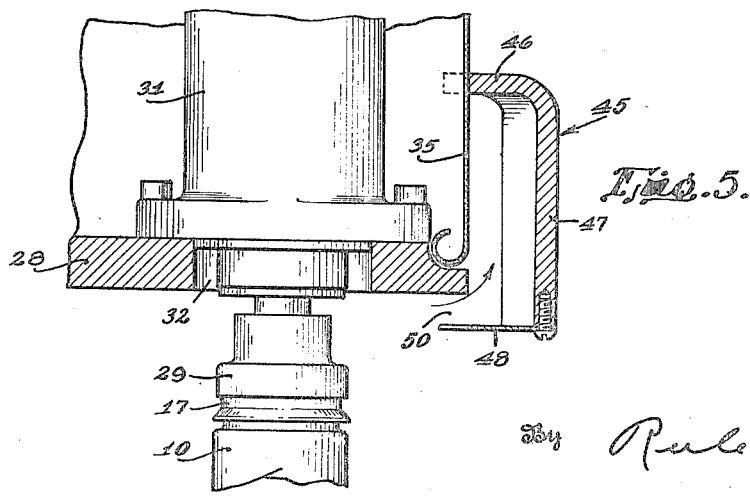
Fig. 5 is a fragmentary sectional view at the line 5—5 on Fig. 1.

The path of the waste steam is shown by arrows in the several figures of the drawings. As shown in Fig. 1, some of the waste steam is caused to flow away from the steam distributor, between the chuck supporting table and the container supporting platform, toward the conduit 45 and into the conduit through the opening 50 (Fig. 5). Steam also flows from the steam distributor through the center of the machine towards an opening 60 in the passageway 37. In addition, steam will flow from the steam distributor through the left-hand portion of the machine as viewed in Fig. 1 over the incoming caps and containers and through the openings 54, 55 to the tapered section 53. The steam from the conduit 45 will enter the passageway 37 through the opening 51 and the steam from the tapered section 53 will enter the passageway 37 through the opening 52. As shown in Figs. 3 and 4 the steam will then pass upwardly through the passageway 37 and thence through the opening 36 to the turret 21, around the vertical shaft 22, and through the opening 37 to the fan 38.

This induced and positive movement of the steam causes an intimate contact with the chuck supporting table, the chucks, the container supporting platform and the allied parts, thereby heating the same. In addition, the upper structure of the machine is also heated since the steam is passed back over the machine and through the turret. A further utilization of the steam is accomplished since it is also used to preheat the incoming caps and containers in the left-hand or inlet portion of the machine.

It is thus apparent that not only is the waste steam removed and prevented from leakage into the atmosphere surrounding the machine but the steam is also utilized to heat the various parts of the machine and thereby aid in maintaining uniform temperature conditions in the machine. This utilization of the steam results in a more uniform vacuum being obtained in the sealed containers.

Modifications may be resorted to within the spirit and scope of the appended claims.

I claim:

1. The method of vacuum sealing containers wherein chucks support closures in register with open-top filled containers, the latter being carried by a support arranged below the chucks and said chucks and supports being subject to relative vertical movement to apply the closures to the containers and to separate the chucks from applied closures, said method comprising moving the chucks, support, containers and closures along a substantially horizontal path through a relatively quiescent cloud of steam, entrapping portions of the steam in the containers incident to application of the closures thereto and applying an external force to the steam and thereby causing a positive movement of the waste steam over and about the chucks and support in advance of and following movement of the latter through said relatively quiescent cloud of steam.

2. The method of vacuum sealing containers wherein chucks support closures in register with open-top filled containers, the latter being carried by a support arranged below the chucks and said chucks and supports being subject to relative movement to apply the closures to the containers and to separate the chucks from the applied closures, said method comprising moving the chucks, support, containers and closures along a substantially horizontal, closed path, injecting steam between said closures and said open-top filled containers during a portion of said path, entrapping a portion of the steam in the containers incident to the application of the closures thereto and applying an external force to the steam to induce a positive movement of the waste steam outwardly from the center of the closed path into contact with the chucks and support.

3. The method of vacuum sealing containers wherein chucks support closures in register with open-top filled containers, the latter being carried by a support arranged below the chucks and said chucks and supports being subject to relative movement to apply the closures to the containers and to separate the chucks from the applied closures, said method comprising moving the chucks, support, containers and closures along a substantially horizontal, closed path, injecting steam between said caps and said open-top filled containers during a portion of said path, entrapping a portion of the steam in the containers incident to the application of the closures thereto and applying an external force to the steam to induce a positive movement of the waste steam outwardly from the center of the closed path towards points outside the path into contact with the chucks and support and thence to a point outside the periphery of the path and diametrically opposite from the point where the steam is injected between the caps and the containers.

4. The method of vacuum sealing containers wherein chucks support closures in register with open-top filled containers, the latter being carried by a support arranged below the chucks and said chucks and supports being subject to relative vertical movement to apply the closures to the containers and to separate the chucks from applied closures, said method comprising moving the chucks, support, containers and closures along a substantially horizontal path through a relatively quiescent cloud of steam, entrapping portions of the steam in the containers incident to application of the closures thereto and applying an external force to the waste steam to move said waste steam outwardly away from the quiescent cloud in a direction counter to the direction of movement of the parts into the cloud of steam and in the same direction of movement of the parts out of the cloud of steam.

5. The method of utilizing waste steam from a container sealing apparatus wherein steam is used which comprises moving the caps through a zone in which they are subjected to steam, pumping the steam to induce a positive movement of said steam from the steam zone in a direction counter to the direction of movement of incoming closure caps and causing said waste steam to contact said caps and heat the same.

6. In combination, a series of closure supporting chucks mounted for continuous movement in a closed horizontal path, means below said chucks for supporting containers in upright horizontal spaced relationship and moving them in register with but spaced from said chucks along a substantial part of said path, means for moving said chucks vertically in succession to thereby apply closures to the containers and then separate the chucks from the applied closures, a steam distributor lying between vertically spaced closures and containers in a part of said path and operable to provide a relatively quiescent cloud of steam through which the closures and containers move, said distributor including means for directing steam between the closures and the containers immediately in advance of final application of the closures to said containers, a hood covering the chucks, a circumferentially extending vertical wall enclosing a substantial extent of the path of movement of the chucks and container supporting means and exhaust means operable to positively circulate waste steam about and in contact with said chucks and container supporting means to preheat the same.

7. In combination, a series of closure supporting chucks mounted for continuous movement on a closed horizontal path, means below said chucks for supporting containers in upright horizontal spaced relationship and moving them in register with but spaced from said chucks along a substantial part of said path, means for moving said chucks vertically in succession to thereby apply closures to the containers and then separate the chucks from the applied closures, a steam distributor lying between vertically spaced closures and containers in a part of said path and operable to provide a relatively quiescent cloud of steam through which the closures and containers move, said distributor including means for directing steam between the closures and the containers immediately in advance of final application of the closures to said containers, a hood covering the chucks, a circumferentially extending vertical wall enclosing a substantial part of the path of movement of the chucks and container supporting means and exhaust means positioned at a point diametrically opposite to said steam distributor operable to positively circulate waste steam from the steam distributor and causing said waste steam to move outwardly from the steam distributor toward said exhaust means and outwardly from said steam distributor toward said vertical wall and thence toward the exhaust means thereby causing said steam to contact the chucks and container supporting means to preheat the same.

8. In combination, a series of closure supporting chucks mounted for continuous movement in a closed horizontal path, means below said chucks for supporting containers in upright horizontal spaced relationship and moving them in register with but spaced from said chucks along a substantial part of said path, means for moving said chucks vertically in succession to thereby apply closures to the containers and then separate the chucks from the applied closures, a steam distributor lying between vertically spaced closures and containers in a part of said path and operable to provide a relatively quiescent cloud of steam through which the closures and containers move, said distributor including means for directing steam between the closures and the containers immediately in advance of final application of the closures to said containers, a hood covering said chucks and surrounding the closed horizontal path thereof, a circumferentially extending vertical wall spaced from said hood and extending a substantial distance along the path of movement of the chucks and container supporting means, providing a space between the hood and the vertical wall, an induction fan, means connecting said fan to said space, the fan being operable to cause a circulation of waste steam from the steam distributor into contact with the chucks and container supporting means and thence from under the hood to the space between the hood and the vertical wall and thence out through the connecting means to the fan.

9. An apparatus for sealing containers comprising a steam distributor, means for continuously moving containers below a portion of said steam distributor, means for moving caps for said containers above a portion of said steam distributor and in register with said containers, means for sealing said caps to said containers and pumping means for inducing a positive movement of waste steam from the steam distributor over and into contact with the means for moving the containers and over and into contact with the means for moving the caps.

10. An apparatus for sealing containers comprising means for continuously moving containers in a horizontal path, means for moving caps for said containers above and in register with said containers, means for injecting steam between said caps and said containers, means for sealing said caps to said containers and pumping means for inducing a positive movement of waste steam from the steam injecting means into contact with the means for moving the container and the means for moving the caps at a point in the path of the caps prior to their being subjected to steam from the steam injecting means.

11. An apparatus for sealing containers comprising a rotatable carriage, a platform mounted on said carriage for supporting containers thereon in horizontally spaced relationship, a chuck supporting table adjustably mounted on said carriage above said platform and movable with the platform, a series of vertically reciprocable cap-supporting chucks mounted on said table in register with the containers, means for injecting steam between said caps and containers during a portion of their travel, means for moving the chucks downward to entrap steam between the caps and containers and to seal the caps to the containers, a stationary hood extending horizontally over said chucks and downwardly to the periphery of the chuck supporting table, a conduit extending along the lower edge of said hood from a point beyond said steam injecting means to a point diametrically opposite from said steam injecting means, the inner wall of said conduit adjacent to the hood being cut away throughout the length of the conduit to provide an opening below the lower edge of the hood, and exhaust means at the end of the conduit opposite the steam injecting means for causing a positive movement of the waste steam from the steam distributor, between the container supporting platform and the chuck supporting table to the opening in the conduit and through the conduit to the exhaust means.

12. An apparatus for sealing containers comprising a rotatable carriage, a platform mounted on said carriage for supporting containers thereon in horizontally spaced relationship, a chuck supporting table adjustably mounted on said carriage above said platform and movable with the platform, a series of vertically reciprocable cap-supporting chucks mounted on said table in register with the containers, means for injecting steam between said caps and containers during a portion of their travel, means for moving the chucks downward to entrap steam between the caps and containers and to seal the caps to the containers, a stationary hood extending horizontally over said chucks and downwardly to the periphery of the chuck supporting table, a conduit extending along the lower edge of said hood from a point beyond said steam injecting means to a point diametrically opposite from said steam injecting means, the inner wall of said conduit adjacent to the hood being cut away throughout the length of the conduit to provide an opening below the lower edge of the hood, and exhaust means at the end of the conduit opposite the steam injecting means for causing a positive movement of the waste steam from the steam distributor between the container supporting platform and the chuck supporting table to the opening in the conduit and through the conduit to the exhaust means, said exhaust means being provided with an opening adjacent to the periphery of the hood.

13. An apparatus for sealing containers comprising a rotatable carriage, a platform mounted on said carriage for supporting containers thereon in horizontally spaced relationship, a chuck supporting table adjustably mounted on said carriage above said platform and movable with the platform, a series of vertically reciprocable cap-supporting chucks mounted on said table in register with the containers, means for injecting steam between said caps and containers during a portion of their travel, means for moving the chucks downward to entrap steam between the caps and containers and to seal the caps to the containers, a stationary hood extending horizontally over said chucks and downwardly to the periphery of the chuck supporting table, a conduit extending along the lower edge of said hood from a point beyond said steam injecting means to a point diametrically opposite from said steam injecting means, the inner wall of said conduit adjacent to the hood being cut away throughout the length of the conduit to provide an opening below the lower edge of the hood, a portion of the carriage extending upwardly through the chuck supporting table and above the level of the hood, a passageway connecting said upper portion of the hood to the end of the conduit which is opposite the steam injecting means, exhaust means at the upper portion for inducing a circulation of waste steam from the steam distributor, between the chuck supporting table and the container supporting table, through the opening in the conduit and through the conduit to the passageway and in turn to the upper portion of the carriage.

14. An apparatus for sealing containers comprising a rotatable carriage, a platform mounted on said carriage for supporting containers thereon in horizontally spaced relationship, a chuck supporting table adjustably mounted on said carriage above said platform and movable with the platform, a series of vertically reciprocable cap-supporting chucks mounted on said table in register with the containers, means for injecting steam between said caps and containers during a portion of their travel, means for moving the chucks downward to entrap steam between the caps and containers and to seal the caps to the containers, a stationary hood extending horizontally over said chucks and downwardly to the periphery of the chuck supporting table, a conduit extending along the lower edge of said hood from a point beyond said steam injecting means to a point diametrically opposite from said steam injecting means, the inner wall of said conduit adjacent to the hood being cut away throughout the length of the conduit to provide an opening below the lower edge of the hood, a portion of the carriage extending upwardly through the chuck supporting table and above the level of the hood, a passageway connecting said upper portion of the hood to the end of the conduit which is opposite the steam injecting means, exhaust means at the upper portion for inducing a circulation of waste steam from the steam distributor, between the chuck supporting table and the container supporting table through the opening in the conduit and through the conduit to the passageway and in turn to the upper portion of the carriage, said passageway being provided with an opening adjacent to the periphery of the hood.

15. In combination, a series of closure supporting chucks mounted for continuous movement in a closed horizontal path, means below said chucks for supporting containers in upright horizontal spaced relationship and moving them in register with but spaced from said chucks along a substantial part of said path, means for moving said chucks vertically in succession to thereby apply closures to the containers and then separate the chucks from the applied closures, a steam distributor lying between vertically spaced closures and containers in a part of said path and operable to provide steam between said closures and containers, a hood covering the chucks, a circumferentially extending vertical wall enclosing a substantial part of the path of movement of the chucks and container supporting means and pumping means operable to positively circulate waste steam about and in contact with said chucks and container supporting means to preheat the same.

16. In combination, a series of closure supporting chucks mounted for continuous movement in a closed horizontal path, means below said chucks for supporting containers in upright horizontal spaced relationship and moving them in register with but spaced from said chucks along a substantial part of said path, means for moving said chucks vertically in succession to thereby apply closures to the containers and then separate the chucks from the applied closures, a steam distributor lying between vertically spaced closures and containers in a part of said path and operable to provide steam between said closures and containers, a hood covering the chucks, a circumferentially extending vertical wall enclosing a substantial part of the path of movement of the chucks and container supporting means and pumping means positioned at a point diametrically opposite to said steam distributor operable to positively circulate waste steam from the steam distributor and causing said waste steam to move outwardly from said steam distributor toward said vertical wall and thence toward the exhaust means thereby causing said steam to contact the chucks and container supporting means to preheat the same.

17. In combination, a series of closure supporting chucks mounted for continuous movement in a closed horizontal path, means below said chucks for supporting containers in upright horizontal spaced relationship and moving them in register with but spaced from said chucks along a substantial part of said path, means for moving said chucks vertically in succession to thereby apply closures to the containers and then separate the chucks from the applied closures, a steam distributor lying between vertically spaced closures and containers in a part of said path and operable to provide steam between the closures and containers, a hood covering said chucks and surrounding the closed horizontal path thereof, a circumferentially extending vertical wall spaced from said hood and extending a substantial distance along the path of movement of the chucks and container supporting means, providing a space between the hood and the vertical wall, an induction fan, means connecting said fan to said space, the fan being operable to cause a circulation of waste steam from the steam distributor into contact with the chucks and container supporting means and thence from under said hood to the space between the hood and the vertical wall and thence out through the connecting means to the fan.

18. The method of utilizing waste steam from a container sealing apparatus wherein steam is used to displace the air in the containers, which method comprises moving the chucks in a closed horizontal path through a steam zone and causing them to pick up caps and apply them to containers during the movement in said closed horizontal path, pumping the steam from said steam zone and thereby inducing a positive movement of the waste steam in the same direction as said chucks, and bringing the steam into contact with the chucks prior to their picking up the caps and thereby heating said chucks.

19. The method of utilizing waste steam from a rotary sealing apparatus wherein steam is injected between closure caps and containers traveling along in register in a closed horizontal path through a steam distributing zone, which method comprises moving cap holding chucks and container supports in a circular path through a steam distributing zone and pumping the steam from the steam distributing zone outwardly in directions emanating from the center of the closed horizontal path to points beyond the periphery of the path and thence over the top of the path.

OLAV BJERING.

References Cited in the file of this patent

UNITED STATES PATENTS

| Number | Name | Date |
| --- | --- | --- |
| 2,081,208 | Regan | May 25, 1937 |
| 2,311,707 | Stewart | Feb. 23, 1943 |
| 2,330,598 | Kronquest | Sept. 28, 1943 |
| 2,343,104 | Williams | Feb. 29, 1944 |
| 2,408,447 | Rau | Oct. 1, 1946 |
| 2,514,027 | Clifcorn et al. | July 4, 1950 |

FOREIGN PATENTS

| Number | Country | Date |
| --- | --- | --- |
| 575,783 | Great Britain | Mar. 5, 1946 |